Dec. 17, 1963  H. G. CISIN  3,114,212
EDUCATIONAL DEVICE
Filed May 18, 1962  2 Sheets-Sheet 1

Harry G. Cisin
INVENTOR

United States Patent Office 3,114,212
Patented Dec. 17, 1963

3,114,212
EDUCATIONAL DEVICE
Harry G. Cisin, Oak Lane, Amagansett, N.Y.
Filed May 18, 1962, Ser. No. 195,840
7 Claims. (Cl. 35—74)

The invention relates to an educational device, and more particularly to a device embodying therein an apparatus which will indicate automatically the accuracy or inaccuracy of the response by the user to given statements or questions.

One object of my invention is to provide a simplified aid to home study by informing the student almost immediately whether his answer to a given question is correct or incorrect.

Another object of my invention is to enable correspondence school students to grade their own examinations, and thus eliminate time-wasting correspondence.

Another object of my invention is to provide a simple device which will enable a student to rate his own proficiency and to record his progress.

Another object of this invention is to provide the home student with an easy means of reviewing the subject he is studying.

Another object of this invention is to provide a simplified teaching device which will permit programming of subject matter being studied, so that knowledge can be acquired in gradual, easy steps.

Another object of my invention is to enable students to learn faster and easier by making home study more effective and enjoyable.

Another object of the invention is to provide a means of linking subject matter to be learned with existing supplementary study materials.

Another object of my invention is to provide an educational device which may also be used as a game suitable either for adults or children whereby propositions which may be propounded for selection as to their truth or falsity can be graded according to the user's intellectual capacity.

Another object of this invention is to provide a knowledge testing device which may be handed from one student or player to another, whereby each may make his selections as to the truth or falsity of the statements propounded, without the other being aware of the answers and whereby the knowledge or lack of knowledge by one user cannot be taken advantage of by a subsequent user.

A feature of this invention is its simplicity of construction and its small number of parts, resulting in low cost of manufacturing and long-life operation.

Another feature of this invention is its convenience and ease of operation, permitting it to be used without instruction or practice.

Still another feature of the invention is the fact that since it does not require electricity in any form for its operation, cost is reduced and it may be used anywhere without the chance of shock and also without the need for replacing batteries.

Still another feature of the invention is the fact that it is operable mechanically and does not use vacuum tubes, magnets, electromagnets, punched tape, transistors, relays, switches, electrical conductors, electrical motors, electric lights or other electrical or electronic equipment.

Another feature of the invention consists in the fact that pertinent illustrations may be used alone without questions or statements or in combination with questions or statements whose truth or falsity is to be determined by the user.

My invention additionally comprises the novel details of construction and arrangement, which in their preferred embodiment only, are illustrated in the accompanying drawings and which are hereinafter more fully described and their essential characteristics pointed out in the accompanying claims.

According to the drawings.

Similar reference numerals refer to similar parts throughout the drawings.

Figure 1:
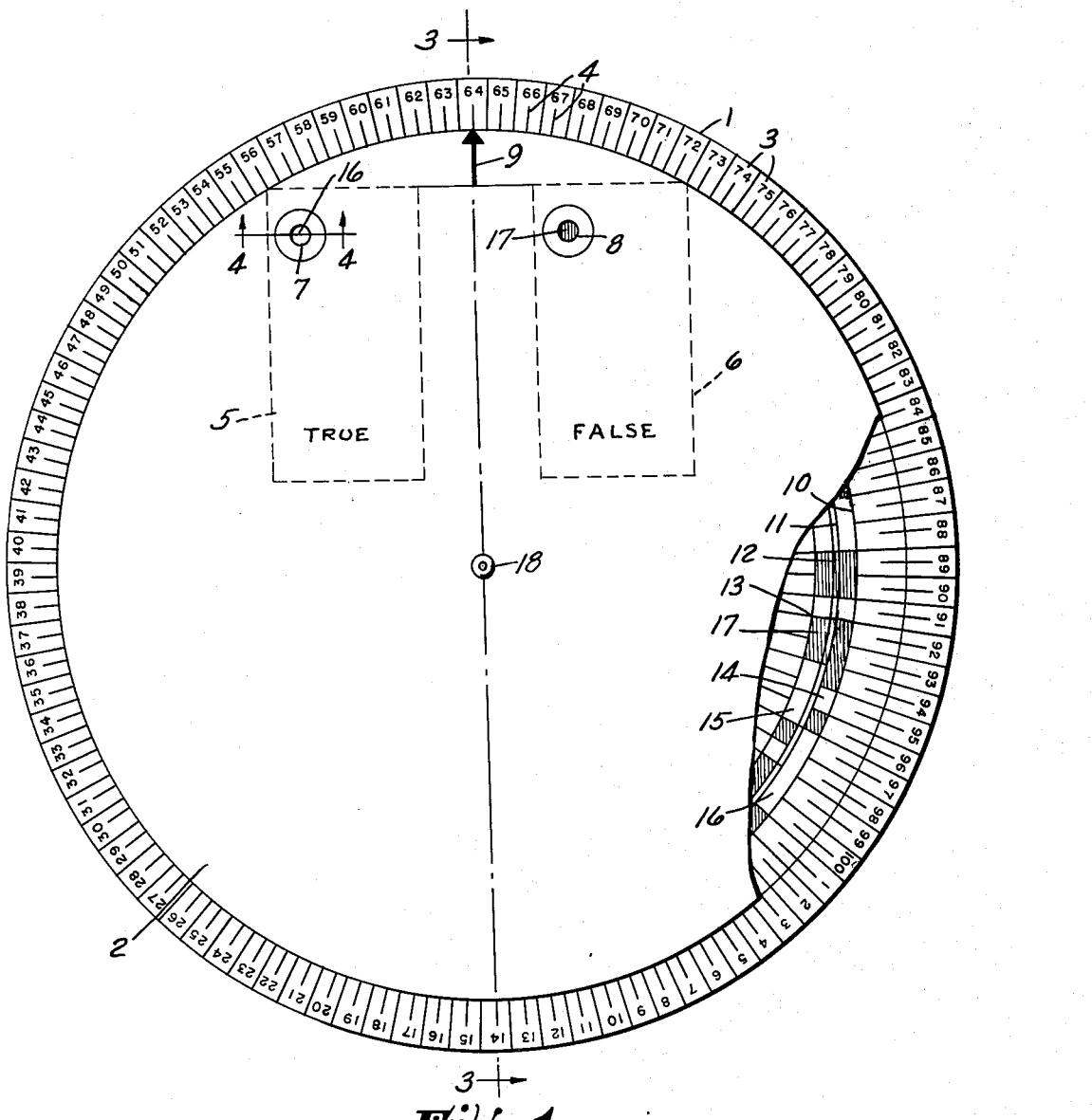
FIGURE 1 is a plan view of a portion of one form of the invention.

In the embodiment of my invention illustrated, I show a larger diameter circular "answering-indicating" member 1 and a smaller diameter circular "locator" member 2, fastened at their central points to permit relative rotation between them.

Member 1 contains a plurality of consecutive numbers, letters or symbols at its outer circumference which are visible at all times, since the diameter of member 2 is small enough not to cover them.

The exact center point of each consecutive number, letter or symbol 3, is indicated by a thin center line 4 placed near the circumference of member 1 and always visible below each number 3.

Member 2 contains an area 5, enclosed in dotted lines, marked "True" or "Correct" and a second area 6, also enclosed in dotted lines marked "False" or "Incorrect."

Area 5 contains a small aperture 7 and area 6 contains a similar small aperture 8. Aperture 7 is slightly nearer to the circumference of member 2, than aperture 8.

An arrow 9 is located on a diameter of member 2 with its point at the circumference of said member, so that when there is relative rotation between members 1 and 2, the head of arrow 9 may be pointed directly at any center line 4 of any number 3 located on element 1.

Apertures 7 and 8 are spaced a predetermined distance apart and on either side of arrow 9. Apertures 7 and 8 are located at different distances from the circumference of member 2, so that as elements 1 and 2 are rotated relative to each other, apertures 7 and 8 will traverse two separate and distinct areas on element 1. Aperture 7 which is nearer to the circumference of member 2 will traverse a circular area 14, bounded by concentric circles 10 and 11. Aperture 8, which is further from the circumference of member 2, will traverse circular area 15, bounded by concentric circles 12 and 13. A portion of element 2 is shown cut away in FIGURE 1, in order to show circular areas 14 and 15 bounded by concentric circles 10—11 and 12—13 respectively.

Areas 14 and 15 are color-coded in a pre-determined manner, so that if the arrow 9 is pointed to any center line 4 of any number 3 on member 1, one color will appear under aperture 7 and a different color will appear under aperture 8. For example with the arrow 9 pointed to the center line 4 of any number 3 on member 1, a green or white color may appear under aperture 7, in which case a red color will appear under aperture 8.

The color codings in areas 15 and 16 on member 1, shown in the cut-away portion of FIGURE 1, determine in advance which numbers 3 will give a "True" or "Correct" indication and which will give a "False" or "Incorrect" indication. The numbers 3 which will give a "True" indication are assigned to statements on "selector-detector" member 19 which are correct. Those which will give a "False" indication are assigned to statements on member 19 which are incorrect.

The color-coded areas 16 and 17 are arranged at random so that it will be almost impossible for user to determine in advance which color will appear in any specific aperture.

Members 1 and 2 are fastened together at their center point by rivet 18, thus permitting relative circulation motion between them.

Figure 2:
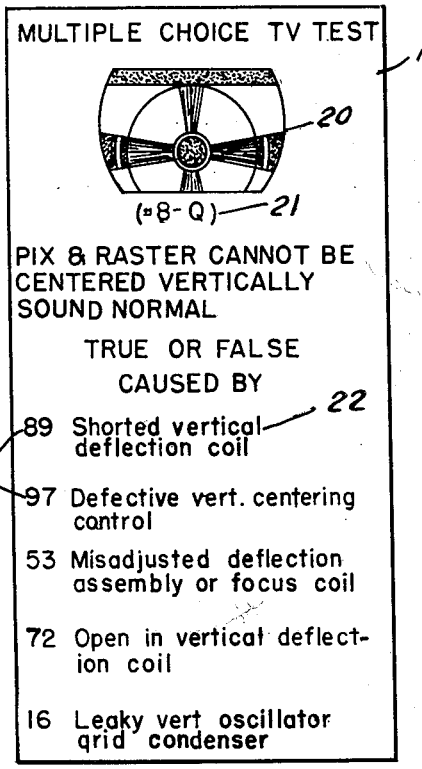
FIGURE 2 is a plan view of a "selector-detector" member used in conjunction with the apparatus shown in FIGURE 1.
Figure 3:
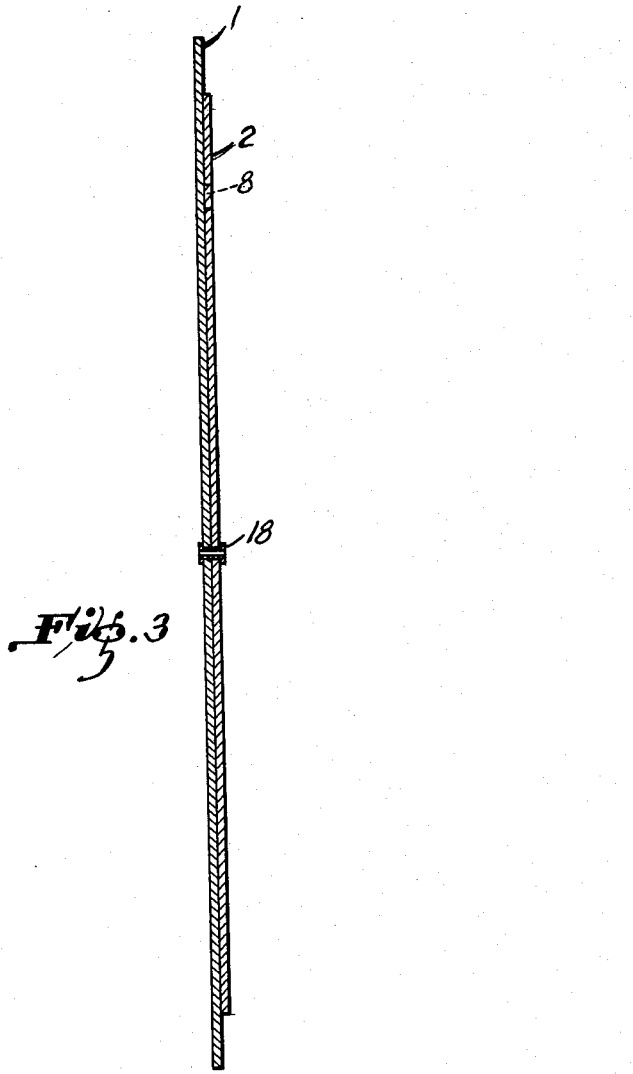
FIGURE 3 is a sectional view taken on the line 3—3 of FIGURE 1.
Figure 4:
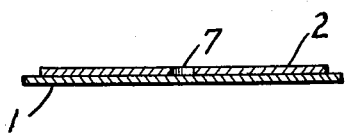
FIGURE 4 is a sectional view taken on the line 4—4 of FIGURE 1.

"Selector-detector" member 19 shown in FIGURE 2, is placed either within the area 5 or 6 on member 2 as decided by the user. Member 19 contains one or more test statements 22, whose truth or falsity is to be determined by the user.

In addition, member 19 may also contain an illustration 20, and a number-letter combination 21, referring to an identical number-letter combination in a book recommended for supplementary study.

Each statement 22 on member 19, is preceded by an identifying numeral which corresponds to an identical numeral 3 on member 1. For example, numeral 89 on member 19, corresponds to numeral 89 at the circumference on member 1. Numeral 97 on member 19 corresponds to numeral 97 on member 1.

The user must decide whether the numbered statement is true or false. If he decides that the statement is true, he must place member 19 over area 5 marked "True." He then rotates member 2 relative to member 1 until arrow 9 points to center line 4 of numeral on member 1 which corresponds to the numeral preceding the statement on member 19. During the rotation, member 19 must be retained over the area 5. If the decision of the user was correct, a white or green color will appear under the uncovered aperture 8. If the decision was incorrect, a red color will appear under aperture 8.

If the user decides that the numbered statement is false, he must place member 19 over the area 6 marked "False," thus covering aperture 8. He then rotates member 2, relative to member 1 until arrow 9 points to center line 4 of the numeral which corresponds to the numeral preceding the statement on member 19. If his decision was correct, a white or a green color will appear under aperture 7. If incorrect, a red color will appear under aperture 7.

"Selector-detector" member 19, shown in FIGURE 2, cooperates with members 1 and 2 to enable the user to make known his selection or decision as to the truth or falsity of a given question or statement 22. This is done by placing member 19 either over the area 5 marked "True" or over the area 6 marked "False." Member 19 also cooperates with members 1 and 2 since it serves as a detector to determine or detect whether the user has been correct or incorrect in his decision as to the truth or falsity of the given statement 22. This is accomplished by keeping member 19 over the selected area, either 5 or 6, while member 2 is rotated relative to member 1, until arrow 9 on member 2 points to the center line 4 of the number at the circumference of member 1 which precedes the statement under consideration on member 19. As a result a coded signal is visible in only one aperture 7 or 8, thus preventing the user from observing code signals under both apertures, in which case it would be impossible to determine whether the user's decision as to the truth or falsity of aforesaid statement was correct or incorrect. Another function of member 19 is to carry the test statements or questions and other pertinent information on its outside face together with their identifying numerals corresponding to the numerals at the outer circumference of member 1.

It is obvious that the arrangement shown in FIGURES 1, 2, 3 and 4 and described herein, has many useful variations, combinations and applications. However, I do not limit my invention to the exact arrangement and parts as described in the said specifications, nor do I confine myself to the exact details of construction of said parts as set forth in the accompanying drawings, since it will be understood by those skilled in the art after understanding the invention, that various changes and further modifications may be made without departing from the spirit and scope of the invention, and it is further intended therefore in the following claims to cover all such changes and modifications.

Having described the invention, what I claim as new and desire to have protected by Letters Patent is:

1. In a device of the character described, a first and a second member, fastened together at their centers and rotatable with respect to each other, said first member circular and of smaller diameter than said second member and containing two areas marked respectively "True" and "False" or with words having similar connotation and within each said areas an aperture, said apertures located on different radii and at different distances from the circumference of said first member, an arrow, pointer or other similar purpose mark located on a radius of said first member between the two said apertures and pointing to the outer circumference of said first member, said second member having a series of consecutive numbers, letters or symbols just within its outer circumference visible at all times, means for locating the center of each letter, number or symbol so that said arrow on said first member may be accurately pointed to this center, by rotating one of said first or said second members with respect to the other, said second member containing on its outer face two separate distinct areas each bounded by concentric circles and each color coded or otherwise coded in a pre-arranged manner, said coding visible only through the two said apertures and arranged so that when said arrow is pointed to the center of any said member, letter or symbol, the color or other coding appearing in the first said aperture will be different from that appearing in the second said aperture and also pre-arranged so that as the pointer or arrow is moved from the center of one said number, letter or symbol, to the center of another, the pre-coded color or other form of signal may or may not change.

2. In a device as claimed in claim 1, a third member containing data whose truth or falsity is to be determined by the user, said data being preceded or followed by a number, letter or symbol corresponding to an identical number, letter or symbol on said first member, said third member or other suitable covering to be placed either over the aperture in said area marked "True," or over the aperture in said area marked "False" according to the decision of the user, said first and second elements to be rotated relative to each other until said arrow points to the same number, letter or symbol on said second member as the said number, letter or symbol appearing on said third member, whereby pre-coded signal will appear under said uncovered aperture, indicating whether or not user has made a correct or an incorrect decision.

3. In a device as described in claim 2, said third member includes statements, questions or other data whose truth or falsity is to be determined by the user.

4. In a device as described in claim 2, said third member includes one or more illustrations, whose nature or function is to be determined by the user.

5. In a device as described in claim 2, said third member also includes reference means linking the subject matter whose truth or falsity is to be determined by the user, with existing supplementary books, charts or other study material, to enable the user in the event that he has made an incorrect decision, to locate accurate information concerning the aforesaid subject matter.

6. In a device as described, actuated and energized solely by hand, comprising only three cooperating movable members, including a first circular "locator" member having locating means for bringing it into a desired position with respect to a second "answering-indicating" member, said second member having numbers or other indicia around its circumference visible at all times and said first member having two areas designated either as "True" or "False" or by words having similar connotations, an aperture in each said "True" or "False" area, said second member also having pre-coded markings or signals visible only through said apertures in said first member, said first and second members fastened to each other at their central points to permit relative circular motion between them, a third "selector-detector" member, said third member containing statements or questions each identified by different numbers, letters or otherwise marked symbols, said third member cooperating with said first and second members by being placed over either one or the other said "True" or "False" areas on said first member so that when said first member is rotated until said locating means points to any number or other distinguishing mark at the circumference of said second member, corresponding to an identical number or other mark associated with any said statement on said third member, said pre-coded signal on said second member will be visible through said uncovered aperture on said first member, automatically indicating whether or not said third member has been correctly placed on said first member.

7. An educational device, intelligence tester or game actuated and energized solely by hand, comprising only three movable members including a first member having two areas designated as "True" and "False" or otherwise designated with words having similar connotations, and within each said area an aperture and between two said areas or in other suitable position, locating means on said first member consisting of a narrow or similar purpose mark pointing towards the circumference of said first member, a second member fastened at its center to the center of said first member to permit relative circular motion between them, said second member having numbers, letters or other indicia around its circumference visible at all times and also having two distinct areas bordered by concentric circles, color coded or otherwise coded in a pre-arranged manner, said coding acting as a signal and being visible only through the two said apertures in said first member, a third member containing one or more numbered, lettered or otherwise marked statements, questions or other data whose truth or falsity is to be determined by the user, said third member to be placed on either one or the other of the two said areas marked "True" and "False on said first member and to be rotated together with said first member until said locating means such as arrow or similar purpose mark on said first member, points to any number or otherwise marked symbol at the circumference of said second member, corresponding to the number, letter or otherwise marked statement on said third member, whereby the said coded area visible through the uncovered aperture on the first said member will indicate automatically whether or not the third said member has been correctly placed on said first member.

References Cited in the file of this patent

UNITED STATES PATENTS

| | | |
|---|---|---|
| 523,338 | Fearn | July 24, 1844 |
| 1,469,919 | Donnianni et al. | Oct. 9, 1923 |
| 1,971,735 | Steele | Aug. 28, 1934 |
| 2,178,906 | Haumerson | Nov. 7, 1939 |
| 2,545,381 | Prentice | Mar. 13, 1951 |
| 2,618,866 | Adams | Nov. 25, 1952 |
| 3,024,540 | Orth | Mar. 13, 1962 |